(12) United States Patent
Hall

(10) Patent No.: US 8,211,963 B2
(45) Date of Patent: Jul. 3, 2012

(54) METHOD OF PURIFYING A POLYMER

(75) Inventor: David Bruce Hall, Ballston Lake, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/209,776

(22) Filed: Aug. 15, 2011

(65) Prior Publication Data

US 2011/0301319 A1 Dec. 8, 2011

Related U.S. Application Data

(62) Division of application No. 11/766,937, filed on Jun. 22, 2007, now Pat. No. 7,999,024.

(51) Int. Cl.
*C08G 65/00* (2006.01)
*C08G 73/00* (2006.01)
*C08G 6/00* (2006.01)

(52) U.S. Cl. ........ 524/378; 524/372; 524/379; 524/381; 524/391; 524/464; 524/470; 524/475; 524/476; 524/494; 524/538; 528/171; 528/196; 528/491

(58) Field of Classification Search ............. 524/372, 524/378, 379, 381, 391, 464, 470, 475, 476, 524/494, 538; 528/171, 196, 491
See application file for complete search history.

(56) References Cited

U.S. PATENT DOCUMENTS

| 5,229,482 | A | 7/1993 | Brunelle |
| 6,630,568 | B1 | 10/2003 | Johnson et al. |
| 6,790,934 | B2 | 9/2004 | Johnson et al. |
| 6,949,622 | B2 | 9/2005 | Silvi et al. |
| 2005/0049392 | A1 | 3/2005 | Khouri et al. |
| 2006/0066004 | A1 | 3/2006 | Richards et al. |
| 2007/0073035 | A1 | 3/2007 | Stella et al. |
| 2007/0225479 | A1 | 9/2007 | Silvi et al. |

FOREIGN PATENT DOCUMENTS

| WO | 0121685 A1 | 3/2001 |
| WO | 0121686 A1 | 3/2001 |
| WO | 2008030229 A1 | 3/2008 |

OTHER PUBLICATIONS

International Search Report for International Application No. PCT/US2008/067319, mailed Apr. 27, 2009, 4 pages.
Written Opinion for International Search Report for International Application No. PCT/US2008/067319, mailed Apr. 27, 2009, 8 pages.
Sperling, "Concentrated Solutions and Phase Separation Behavior", Introduction to Physical Polymer Science, 2nd Edition, Chapter 4, pp. 122-127, 1992.

*Primary Examiner* — Ana Woodward
(74) *Attorney, Agent, or Firm* — Cantor Colburn LLP; Diderico van Eyl

(57) ABSTRACT

A method for purifying a polymer comprising providing a first mixture comprising at least one solvent and at least one polymeric material, diluting the first mixture with veratrole to produce a second mixture in which the polymeric material is substantially dissolved at a temperature less than 100° C., performing at least one step selected from (i) contacting the second mixture with an aqueous wash solution, and (ii) filtering the second mixture.

14 Claims, No Drawings

METHOD OF PURIFYING A POLYMER

This application is a divisional application of U.S. patent application Ser. No. 11/766,937 filed on Jun. 22, 2007 and which is incorporated by reference herein in its entirety.

BACKGROUND

The invention relates generally to methods of purifying a polymer. More particularly the invention relates to methods of purifying a polymer by using a mixture of solvents.

Some methods used for the preparation of polymeric material employ a phase transfer catalyst and/or alkali metal salts of aromatic dihydroxy compounds. The polymeric material is generally subjected to a devolatilization extrusion to obtain a polymer substantially free of the polymerization solvent that is employed during the polymerization process. The presence of residual catalyst during devolatilization extrusion can lead to elevated color in the isolated resin. It is known in the art that residual salt could lead to the formation of haze in polymer pellets.

Typically the process of isolating the polymeric material from a polymerization reaction mixture includes the steps of diluting the polymerization mixture (concentration: about 30 weight percent of polymeric material based on the total weight of polymerization reaction mixture) with a suitable solvent and filtering the resultant diluted mixture. However, in some instances dilution and cooling results in a polymer rich bottom phase and a solvent rich upper phase. Further cooling may cause the polymer rich phase to become more and more viscous until it is almost solid-like. It is not desirable to have this type of phase separation during polymer filtration and aqueous extraction. This phase change is completely reversible if the solution is re-heated and concentrated back to its original state. Heating and concentration results in the substantial dissolution of the polymeric material in the solvent. However filtering or extracting the reaction mixture at a temperature greater than 100° C. and at concentrations of 30 weight percent of polymeric material may not be feasible. Further it may not result in the effective removal of the residual catalyst and the salt.

The present invention provides, among other benefits, a simple and yet elegant solution to this problem.

BRIEF DESCRIPTION

In one embodiment, the present invention provides a method for purifying a polymer. The method includes providing a first mixture comprising at least one solvent and at least one polymeric material, diluting the first mixture with veratrole to produce a second mixture in which the polymeric material is substantially dissolved at a temperature less than 100° C., performing at least one step selected from (i) contacting the second mixture with an aqueous wash solution, and (ii) filtering the second mixture.

In another embodiment, the present invention provides a method for purifying a polyetherimide. The method includes providing a first mixture comprising at least one solvent and at least one polyetherimide, diluting the first mixture with veratrole to produce a second mixture in which the polyetherimide is substantially dissolved at a temperature less than 100° C., performing at least one step selected from (i) contacting the second mixture with an aqueous wash solution, and (ii) filtering the second mixture.

In yet another embodiment, the present invention provides a method for purifying a polyethersulfone. The method includes providing a first mixture comprising at least one solvent and at least one polyethersulfone, diluting the first mixture with veratrole to produce a second mixture in which the polyethersulfone is substantially dissolved at a temperature less than 100° C., performing at least one step selected from (i) contacting the second mixture with an aqueous wash solution, and (ii) filtering the second mixture.

In yet still another embodiment, the present invention provides a method for purifying a polyetherimide-polyethersulfone copolymer. The method includes providing a first mixture comprising at least one solvent and at least one polyetherimide-polyethersulfone copolymer, diluting the first mixture with veratrole to produce a second mixture in which the polyetherimide-polyethersulfone copolymer is substantially dissolved at a temperature less than 100° C., performing at least one step selected from (i) contacting the second mixture with an aqueous wash solution, and (ii) filtering the second mixture.

In another embodiment, the present invention provides a method for preparing a polymer. The method includes polymerizing at least two reactants to provide a first mixture comprising at least one solvent and at least one polymeric material, diluting said first mixture with veratrole to produce a second mixture in which the polymeric material is substantially dissolved at a temperature less than 100° C., performing at least one step selected from (i) contacting the second mixture with an aqueous wash solution, and (ii) filtering the second mixture.

DETAILED DESCRIPTION

In the following specification and the claims, which follow, reference will be made to a number of terms, which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein the term "substantially dissolved polymeric material" means that the polymeric material is homogeneously distributed in a solvent or solvent mixture.

In one embodiment, the present invention provides a method for purifying a polymer. The method includes providing a first mixture comprising at least one solvent and at least one polymeric material, diluting the first mixture with veratrole to produce a second mixture in which the polymeric material is substantially dissolved at a temperature less than 100° C., performing at least one step selected from (i) contacting the second mixture with an aqueous wash solution, and (ii) filtering the second mixture.

The method of the present invention is particularly well suited for the purification of polyetherimides, polyethersulfones, and copolymers thereof. Thus, in one embodiment, the polymeric material comprises a polyetherimide. In another embodiment, the polymeric material comprises a polyethersulfone. In yet another embodiment, the polymeric material comprises a polyetherimide-polyethersulfone copolymer.

In one embodiment, the polymeric material has a glass transition temperature in a range from about 230° C. to about 280° C. In another embodiment, the polymeric material has a glass transition temperature in a range from about 240° C. to about 275° C. In yet another embodiment, the polymeric material has a glass transition temperature in a range from about 250° C. to about 270° C. Where the polymeric material comprises two or more different polymers, the polymeric material may display more than one glass transition temperature.

In one embodiment, the polymeric material comprises a polyetherimide having a number average molecular weight in a range from about 10,000 grams per mole to about 40,000 grams per mole as measured by gel permeation chromatography using polystyrene standards. In another embodiment, the polymeric material comprises a polyetherimide having a number average molecular weight in a range from about 12,000 grams per mole to about 35,000 grams per mole. In yet another embodiment, the polymeric material comprises a polyetherimide having a number average molecular weight in a range from about 15,000 grams per mole to about 30,000 grams per mole.

In various embodiments of the present invention the polymeric material comprises a polyetherimide. The polyetherimide may have been prepared using any process and yet may be purified using the method of the present invention. In one embodiment, the polyetherimide may be prepared by polymerizing a bis(halophthalimide) with a salt of at least one aromatic dihydroxy compound. For example, the bis(halophthalimide) may be prepared and polymerized as described in U.S. Pat. No. 6,919,418. As taught in U.S. Pat. No. 6,919,418, bis(halophthalimide)s may be prepared by reacting a halophthalic anhydride with a diamine.

Non-limiting examples of suitable halophthalic anhydrides include, 3-chlorophthalic anhydride; 4-chlorophthalic anhydride; and combinations thereof. In one embodiment the polyetherimide being purified comprises structural units derived from 3-chlorophthalic anhydride.

Non-limiting examples of suitable diamines include 1,3-phenylenediamine (m-PDA); 1,4-phenylenediamine (p-PDA); 1,2-phenylenediamine; 4,4-diaminodiphenylether; paraxylylenediamine; 4,4-diaminodiphenylmethane; benzidine; 3,3'-dimethoxybenzidine; 3,3'-diaminobenzophenone; 3,4'-diaminobenzophenone; 3,3'-diaminodiphenylmethane; 3,4'-diaminodiphenylmethane; 3,3'-diaminodiphenylsulfide; 3,4'-diaminodiphenylsulfide; 3,3'-diaminodiphenylether; 3,4'-diaminodiphenylether; 3,3'-diaminobenzophenone; 2,4-diaminotoluene; 1,4-diamino-2-methoxybenzene; 2,5-diaminoxylene; 1,3-diamino-4-chlorobenzene; 1,4-diamino-2,5-dichlorobenzene; 1,4-diamino-2-bromobenzene; 1,3-diamino-4-isopropylbenzene; 2,2-bis(4'-aminophenyl)propane; 4,4'-diaminodiphenylmethane; 2,2'- or 4,4'-diaminostilbene; 4,4'-diamino-2,2',3,3',5,5',6,6'-octafluorodiphenylmethane; 4,4'-diamino-2,2',3,3',5,5',6,6'-octafluorodiphenylether; 4,4'-diaminodiphenylether; 4,4'-diamino-2,2',3,3',5,5',6,6'-octafluorodiphenylether; 4,4'-diaminodiphenylthioether; 4-aminophenyl 4-aminobenzoate; 2,2'- or 4,4'-diaminobenzophenone; 2,3-diaminobenzophenone; 4-(4-aminophenylcarbamoyl)aniline; bis(4-aminophenyl) phenyl phosphine oxide; bis(3-aminophenyl) methylphosphine oxide; bis(4-aminophenyl) methylphosphine oxide; bis(4-aminophenyl) cyclohexylphosphine oxide; N,N-bis(4-aminophenyl)aniline; N,N-bis(4-aminophenyl)-N-methylamine; 2,2'-,3,3'-, or 4,4'-diaminoazobenzene; 4,4'-diaminodiphenylurea; 1,8- or 1,5-diaminonaphthalene; 1,5-diaminoanthraquinone; diaminofluoranthene; 3,9-diaminochrysene; diaminopyrene; bis(4-aminophenyl)diethylsilane; bis(4-aminophenyl)dimethylsilane; bis(4-aminophenyl)tetramethyldisiloxane; 2,6-diaminopyridine; 2,4-diaminopyrimidine; 3,6-diaminoacridine; 2,4-diamino-5-triazine; 2,7-diaminodibenzofuran; 2,7-diaminocarbazole; 3,7-diaminophenothiazine; 5,6-diamino-1,3-dimethyluracil; 2,5-diamino-1,3,4-thiadiazole; dimethylenediamine; trimethylenediamine; tetramethylenediamine; hexamethylenediamine; heptamethylenediamine; octamethylenediamine; nonamethylenediamine; decamethylenediamine; 2,2-dimethylpropylenediamine; 2,5-dimethylhexamethylenediamine; 2,5-dimethylheptamethylenediamine; 4,4-dimethylheptamethylenediamine; 3-methylheptamethylenediamine; 3-methoxyhexamethylenediamine; 5-methylnonamethylenediamine; 1,12-diaminooctadecane; 2,11-diaminododecane; 1,2-bis(3-aminopropoxy)ethane; and combinations thereof. In one embodiment, the diamine is 4,4'-diaminodiphenylether.

Non-limiting examples of suitable aromatic dihydroxy compounds include, 2,2-bis-(4-hydroxyphenyl)propane (bisphenol-A); 4,4'-dihydroxybiphenyl(biphenol); 2,4'-dihydroxydiphenylmethane; bis-(2-hydroxyphenyl)methane; bis-(4-hydroxyphenyl)methane; bis-(4-hydroxy-5-nitrophenyl)methane; bis-(4-hydroxy-2,6-dimethyl-3-methoxyphenyl)methane; 1,1-bis-(4-hydroxyphenyl)ethane; 1,2-bis-(4-hydroxyphenyl)ethane; 1,1-bis-(4-hydroxy-2-chlorophenyl)ethane; 1,1-bis-(2,5-dimethyl-4-hydroxyphenyl)ethane; 1,3-bis-(3-methyl-4-hydroxyphenyl)propane; 2,2-bis-(3-phenyl-4-hydroxyphenyl)propane; 2,2-bis-(3-isopropyl-4-hydroxyphenyl)propane; 2,2-bis-(4-hydroxynaphthyl)propane; 2,2-bis-(4-hydroxyphenyl)pentane; 3,3-bis-(4-hydroxyphenyl)pentane; 2,2-bis-(4-hydroxyphenyl)heptane; bis-(4-hydroxyphenyl)phenylmethane; bis-(4-hydroxyphenyl)cyclohexylmethane; 1,2-bis-(4-hydroxyphenyl)-1,2-bis-(phenyl)propane; 2,2-bis-(4-hydroxyphenyl)-1-phenylpropane; and combinations thereof.

In one embodiment, the polymeric material comprises a polyethersulfone having a number average molecular weight in a range from about 10,000 grams per mole to about 40,000 grams per mole as measured by gel permeation chromatography using polystyrene standards. In another embodiment, the polymeric material comprises a polyethersulfone having a number average molecular weight in a range from about 12,000 grams per mole to about 35,000 grams per mole. In yet another embodiment, the polymeric material comprises a polyethersulfone having a number average molecular weight in a range from about 15,000 grams per mole to about 30,000 grams per mole.

In various embodiments wherein the polymeric material comprises a polyethersulfone, the polyethersulfone prepared using any process may be purified using the method of the present invention. In one embodiment, the polyethersulfone may be prepared by polymerizing a bis(halophthalimide) sulfone with a salt of at least one aromatic dihydroxy compound. For example, the bis(halophthalimide) sulfone may be prepared and polymerized as described in U.S. Pat. No. 6,849,706. In one embodiment, the bis(halophthalimide) sulfone may be prepared by reacting a halophthalic anhydride with a diaminosulfone.

Suitable halophthalic anhydrides and aromatic dihydroxy compounds may be same or similar to those listed above. Non-limiting examples of suitable diaminosulfones include, 3,3'-diaminodiphenylsulfone; 3,4'-diaminodiphenylsulfone; 4,4'-diaminodiphenylsulfone; bis(aminophenoxy)phenyl sulfone; bis(4-(4-aminophenoxy)phenyl)sulfone; and bis(4-(3-aminophenoxy)phenyl)sulfone. In one embodiment, the diaminosulfone is 4,4'-diaminodiphenylsulfone.

In one embodiment, the polymeric material comprises a polyetherimide or polyethersulfone prepared using a process referred to as the chloro-displacement process. The chloro-displacement process for the preparation of polyetherimide/polyethersulfone is illustrated as follows: 3-chlorophthalic anhydride and a diamine are reacted in the presence of a catalytic amount of sodium phenyl phosphinate catalyst to produce the bisimide of the 3-chlorophthalic anhydride. The bisimide of the 3-chlorophthalic anhydride is subjected to polymerization by chloro-displacement reaction with the disodium salt of a mixture of bisphenol-A and/or biphenol in the presence of hexaethyl guanidinium chloride (phase transfer catalyst) in ODCB solvent. In one embodiment, the polyetherimide may be prepared using 4,4'-diaminodiphenyl ether as the diamine. In one embodiment, the polyether sulfone may be prepared using 4,4'-diaminodiphenylsulfone as the diamine. In one embodiment, the polyetherimide-polyethersulfone copolymer may be prepared using the methods described for polyetherimide and polyethersulfone above.

In one embodiment, the solvent includes halogenated aromatic solvents, aromatic ether solvents, and polar aprotic solvents. Non-limiting examples of suitable halogenated aromatic solvents include, o-dichlorobenzene (ODCB), dichlorotoluene and 1,2,4-trichlorobenzene; and diphenyl sulfone. Non-limiting examples of suitable aromatic ether solvents include, diphenyl ether, phenetole (ethoxybenzene), and anisole (methoxybenzene). In many instances, halogenated aromatic solvents are preferred over alkoxybenzenes since the former have less tendency than the latter to interact with and inactivate the phase transfer catalyst described below. Non-limiting examples of suitable polar aprotic solvents include dimethylformamide (DMF), dimethylacetamide (DMAc), dimethylsulfoxide (DMSO), and N-methylpyrrolidinone (NMP). In one embodiment, the solvent used may be the same as the polymerization solvent. In one embodiment, the solvent is ODCB.

In one embodiment, the first mixture is diluted with a co-solvent. In various embodiments, the co-solvent is a solvent having the following properties. The properties include miscibility with the solvent, immiscibility with water, inertness to side reactions with polymer and/or other compounds in the process, ease of separation from the solvent during solvent recovery, and with a boiling point in a range of about 100° C. to about 250° C. The main role of the co-solvent is to provide a substantially dissolved polymeric material in the presence of the solvent at temperatures lower than the boiling point of the solvent. In one embodiment, the co-solvent is veratrole.

In one embodiment, the diluting of the first mixture with veratrole to produce a second mixture is carried out at a temperature in a range from about 80° C. to about 250° C. In another embodiment, the diluting of the first mixture with veratrole to produce a second mixture is carried out at temperature in a range from about 80° C. to about 180° C. In yet another embodiment, the diluting of the first mixture with veratrole to produce a second mixture is carried out at temperature in a range from about 90° C. to about 150° C.

In one embodiment, the filtration of the second mixture is carried out at a temperature in a range from about 25° C. to about 250° C. In another embodiment, the contacting of the filtration of the second mixture is carried out at a temperature in a range from about 80° C. to about 180° C. In yet another embodiment, the filtration of the second mixture is carried out at a temperature in a range from about 90° C. to about 150° C. Filtration may be carried out using methods known to one skilled in the art.

In one embodiment, the contacting of the second mixture with an aqueous wash solution is carried out at a temperature in a range from about 25° C. to about 200° C. In another embodiment, the contacting of the second mixture with an aqueous wash solution is carried out at a temperature in a range from about 50° C. to about 150° C. In yet another embodiment, the contacting of the second mixture with an aqueous wash solution is carried out at a temperature in a range from about 70° C. to about 120° C.

In one embodiment, the aqueous wash solution includes an acid. In one embodiment the acid is an inorganic acid. Non-limiting examples of suitable inorganic acids include hydrochloric acid, sulfuric acid and phosphoric acid. In one embodiment, the acid is phosphoric acid.

In one embodiment, the first mixture includes at least 20 weight percent by weight polymeric material based on a total weight of polymeric material and solvent. In another embodiment, the first mixture includes at least 25 weight percent by weight polymeric material based on a total weight of polymeric material and solvent. In yet another embodiment, the first mixture includes at least 30 weight percent by weight polymeric material based on a total weight of polymeric material and solvent.

In one embodiment, the second mixture includes from about 5 weight percent to about 18 weight percent by weight polymeric material based on a total weight of polymeric material, solvent, and veratrole. In another embodiment, the second mixture includes from about 8 weight percent to about 15 weight percent by weight polymeric material based on a total weight of polymeric material, solvent, and veratrole. In yet another embodiment, the second mixture includes from about 10 weight percent to about 12 weight percent by weight polymeric material based on a total weight of polymeric material, solvent, and veratrole In one embodiment, the polymeric material in the second mixture is substantially dissolved at a temperature less than 100° C. In another embodiment, the polymeric material in the second mixture is substantially dissolved at a temperature less than 60° C. In yet another embodiment, the polymeric material in the second mixture is substantially dissolved at a temperature greater than 25° C. In one embodiment, the polymeric material in the second mixture is substantially dissolved at a temperature in a range from about 25° C. to about 100° C. In another embodiment, the polymeric material in the second mixture is substantially dissolved at a temperature in a range from about 40° C. to about 90° C. In yet another embodiment, the polymeric material in the second mixture is substantially dissolved at a temperature in a range from about 50° C. to about 80° C.

As noted, in one embodiment, the present invention provides a method for purifying a polyetherimide. The method includes providing a first mixture comprising at least one solvent and at least one polyetherimide, diluting the first mixture with veratrole to produce a second mixture in which the polyetherimide is substantially dissolved at a temperature less than 100° C., performing at least one step selected from (i) contacting the second mixture with an aqueous wash solution, and (ii) filtering the second mixture.

In one embodiment, the polyetherimide includes structural units having Formula (I):

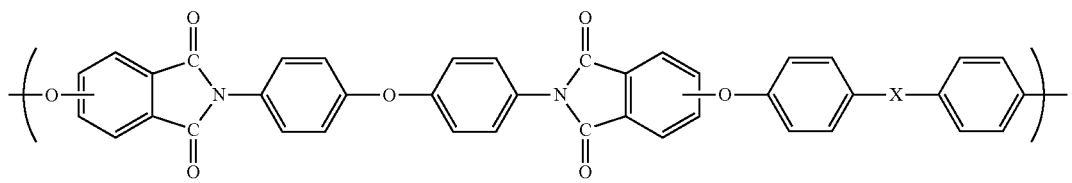

(I)

wherein X is a bond, a —C(CH₃)₂ group, —O—, or —S—.

In another embodiment, the present invention provides a method for purifying a polyethersulfone. The method includes providing a first mixture comprising at least one solvent and at least one polyethersulfone, diluting the first mixture with veratrole to produce a second mixture in which the polyethersulfone is substantially dissolved at a temperature less than 100° C., performing at least one step selected from (i) contacting the second mixture with an aqueous wash solution, and (ii) filtering the second mixture.

In one embodiment, the polyethersulfone includes structural units having Formula (II):

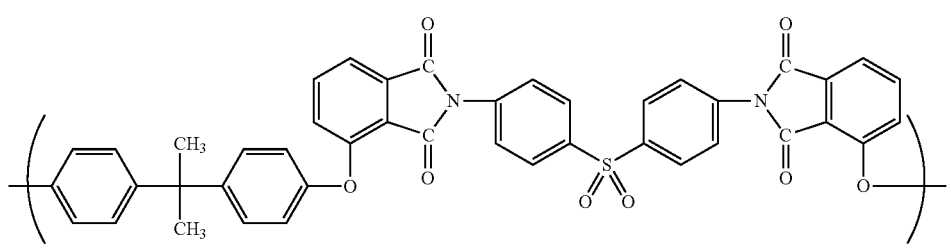

(II)

In one embodiment, the present invention provides a method for purifying a polyetherimide-polyethersulfone copolymer. The method includes providing a first mixture comprising at least one solvent and at least one polyetherimide-polyethersulfone copolymer, diluting the first mixture with veratrole to produce a second mixture in which the polyetherimide-polyethersulfone copolymer is substantially dissolved at a temperature less than 100° C., performing at least one step selected from (i) contacting the second mixture with an aqueous wash solution, and (ii) filtering the second mixture.

As noted, in one embodiment, the present invention provides a method for preparing a polymer. The method comprises polymerizing at least two reactants to provide a first mixture comprising at least one solvent and at least one polymeric material, diluting the first mixture with veratrole to produce a second mixture in which the polymeric material is substantially dissolved at a temperature less than 100° C., performing at least one step selected from (i) contacting the second mixture with an aqueous wash solution, and (ii) filtering the second mixture. Thus, a first mixture comprising at least one solvent and at least one polymeric material may be prepared by polymerizing a bis(halophthalimide) with the salt of a dihydroxy aromatic compound in an inert solvent at a temperature in a range between about 120° C. and about 200° C. in the presence of an organic phase transfer catalyst. In one embodiment, the bis(halophthalimide) is the product obtained by reacting p-phenylene diamine with 2 equivalents of 4-chlorophthalic anhydride, the salt of the dihydroxy aromatic compound is bisphenol A disodium salt, the solvent is ODCB, and the phase transfer catalyst is hexaethylguanidinium chloride. In another embodiment, the bis(halophthalimide) is the product obtained by reacting 4,4'-diaminodiphenyl sulfone with 2 equivalents of 3-chlorophthalic anhydride, the salt of the dihydroxy aromatic compound is a 8:2 mixture bisphenol A disodium salt and biphenol disodium salt, the solvent is ODCB, and the phase transfer catalyst is hexaethylguanidinium chloride.

Polymer products isolated according to the methods described herein may be transformed into useful articles directly, or may be blended with one or more additional polymers or polymer additives and subjected to injection molding, compression molding, extrusion methods, solution casting methods, and like techniques to provide useful articles.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight and temperature is in degrees centigrade (° C.).

Molecular weights of polymers were measured using gel permeation chromatography using polystyrene standards.

Example 1

Provides a Method for Determining the Amount of the Solvent and Co-Solvent to Substantially Dissolve Polyetherimide at Less than 100° C.

The polyetherimide used in this example had a weight average molecular weight of 60,000 grams per mole. The polyetherimide was prepared by polymerizing the bisimide of 3-chlorophthalic anhydride (100 mole percent) and 4,4'-diaminodiphenylether (100 mole percent) with a mixture containing 60 mole percent disodium salt of biphenol and 40 mole percent disodium salt of bisphenol-A in the presence of hexaethyl guanidium chloride, using a chloro-displacement polymerization method. A 10 weight percent solution of the polyetherimide (20 grams (g)) in ODCB 37 milliliters (ml)) was prepared. The solution was cooled to 100° C. This resulted in the formation of a solution having two layers, a viscous polyetherimide-rich phase and a non-viscous ODCB-rich phase. The solution having two layers was further diluted using a solvent mixture having different amounts of ODCB and veratrole to 10 weight percent (i.e., 10 weight percent polyetherimide based on the total weight of polyetherimide, ODCB and veratrole). The further dilution resulted in a single layer solution where the polyetherimide was substantially dissolved i.e., homogeneously distributed in the solvent mixture. The temperature at which a single layer solution was obtained for a given solvent mixture was also recorded. The amounts of ODCB, veratrole and the temperature are provided in Table 1.

TABLE 1

Solvent mixture and corresponding temperature at which polyetherimide is substantially dissolved on dilution.

| ODCB | | Veratrole | | |
| --- | --- | --- | --- | --- |
| Volume percent | Amount ml | Volume percent | Amount ml | Temperature ° C. |
| 85 | 21 | 15 | 84 | 60 |
| 75 | 36 | 25 | 71 | 25 |

The phase separation was suppressed at temperatures above 60° C. and 25° C. by employing the method of the present invention. This clearly shows that by using an appropriate quantity of ODCB (solvent) and veratrole (co-solvent) the phase separation that occurs at temperatures below 100° C. in a polymer/ODCB solution can be suppressed or eliminated. These conditions improve the ease with which the polymer solution can be filtered and/or extracted with aqueous acid.

Example 2

Provides a Method for Purifying a Polyethersulfone Product at Temperatures Above 25° C.

The polyethersulfone used in this example had a weight average molecular weight of 56,000 grams per mole. The polyethersulfone was prepared using a similar process as described above for polyetherimide in Example 1 except that the bisimide of 3-chlorophthalic anhydride (100 mole percent) and 4,4'-diaminodiphenylsulfone (100 mole percent) was reacted with the disodium salt of bisphenol-A (100 mole percent). A 14 weight percent solution of the polyethersulfone in 1,2-dichlorobenzene was prepared. The solution was cooled to 110° C. This resulted in the formation of a solution having two layers as described above. The solution was further diluted to 10 weight percent using a solvent mixture having 65 volume percent ODCB and 35 volume percent veratrole (i.e., 10 weight percent polyethersulfone based on the total weight of polymer, ODCB and veratrole). This resulted in a single layer solution. The single layer was observed at temperatures above 25° C. The diluted polyethersulfone solution was heated to at 90° C. and filtered. The filtrate was extracted by contacting with water at 90° C. The resultant polymer solution had less than 1 parts per million sodium and less than 10 parts per million residual hexaethyl guanidium chloride.

Example 3

Provides a Method for Purifying Polyetherimide Product at Temperatures Above 25° C.

The procedure used was the same as in Example 2 except that a polyetherimide having a weight average molecular weight of 45,000 grams per mole was used. The polyetherimide was prepared using a similar process as described above in Example 1 except that 80 mole percent biphenol sodium salt and 20 mole percent bisphenol-A sodium salt was used for the polymerization. A single layer 10 weight percent solution of polyetherimide in 65 volume percent ODCB and 35 volume percent veratrole was prepared in a similar manner as described for polyethersulfone in Example 2. The single layer solution was filtered at 90° C. and the filtrate extracted with water at 90° C. The resultant polymer solution had less than 1 parts per million sodium and less than 10 parts per million residual hexaethyl guanidium chloride.

Example 4

Illustrates the Stability of Veratrole to Side Reactions in the Presence of Aqueous Phosphoric Acid and Hexaethyl Guanidium Chloride To a mixture of veratrole (35 volume percent) and ODCB (65 volume percent) was added 1000 ppm aqueous phosphoric acid (85 weight percent $H_3PO_4$ in water) and 348 ppm of hexaethyl guanidium chloride. The resultant mixture was heated to about 180° C. After 10 minutes the mixture was cooled to 100° C. and maintained at 100° C. for about 2 hours. The resultant mixture was analyzed. Visual analysis indicated no change in color or appearance of the solution. Ion chromatography technique (IC) was employed to study the decomposition of hexaethyl guanidium chloride. Gas chromatography (GC) and IC were employed to study the decomposition of veratrole. No significant decomposition was observed for the hexaethyl guanidium chloride and veratrole.

Example 5

Illustrates the Stability of Veratrole to Side Reactions During Distillation

To a mixture of veratrole (35 volume percent), ODCB (64 volume percent) and water (1 volume percent) was added 10 ppm of hexaethyl guanidium chloride. The resultant mixture was heated to about 210° C. About 74 volume percent of the mixture was distilled off over the course of one hour. The resultant distillate was colorless. The bottoms had a slight yellow color. The mass balance of the bottoms determined using IC did not indicate significant side reaction of hexaethyl guanidium chloride with veratrole. GC and IC were employed to study the decomposition of veratrole. No significant decomposition was observed for veratrole.

Example 6

Illustrates the Stability of Veratrole to Side Reactions During Superheating i.e., at Temperatures of About 280° C.

A mixture of veratrole and 30 ppm of hexaethyl guanidium chloride was heated to about 280° C. under nitrogen atmosphere in hastalloy-C pressure vessel for about 1 minute. The mixture was cooled to about 260° C. and maintained at 260° C. for about 10 minutes. The mixture was further cooled to about 200° C. and maintained at 200° C. for about 20 minutes. The resulting solution had a grayish color. IC did not indicate significant side reaction of hexaethyl guanidium chloride with veratrole. GC and IC did not indicate significant decomposition of veratrole.

Example 7

Illustrates the Stability of Veratrole During Acid Quenching of Polymer

The polyethersulfone used in this example had a weight average molecular weight of 52,000 grams per mole. The polyethersulfone was prepared using a similar process as described above in Example 2. About 42.3 g of the resultant 30 weight percent polymerization solution (30 weight percent polyethersulfone based on the weight of reaction mixture) was diluted with 17 ml of veratrole. The mixture was heated to about 178° C. and 0.1 ml of aqueous phosphoric acid (85 weight percent) was added. The mixture was stirred for about 10 minutes. Veratrole (21 ml) and ODCB (33 ml) was added to the mixture and the mixture was cooled to about 90° C. The mixture was filtered at 90° C. using a 5 micron teflon membrane to remove sodium chloride. The filtrate contained less than 1 ppm sodium chloride. The filtrate at 90° C. was mixed with water 47 ml at 90° C. and the resultant mixture allowed to stand for about 60 minutes to provide and a top aqueous layer and a bottom organic layer. The bottom organic layer had less than 5 ppm residual hexaethyl guanidium chloride. IC did not indicate decomposition of hexaethyl guanidium chloride. GC and IC did not indicate significant decomposition of veratrole.

Example 8

Provides a Pilot Scale Method for Purifying a Polyethersulfone

The polyethersulfone used in this example had a weight average molecular weight of 51,000 grams per mole. The polyethersulfone was prepared in a similar manner as described in Example 2 above. The resultant 30 weight percent solution of polyethersulfone in ODCB weighed about 17.1 kilograms (Kg). The solution was diluted to a 10 weight percent solution of polyethersulfone by adding 16.1 Kg ODCB and 14.5 Kg veratrole. The diluted solution was cooled to 90° C. and filtered through a 1 micron rated Nomex Bag Filter. The filtrate contained less than 1 ppm residual sodium chloride. The filtrate was mixed with water (23 liters (L)) at 90° C. to extract the residual hexaethyl guanidium chloride. After mixing for about 3 minutes the mixture was allowed to settle for about 55 minutes. The resultant organic and aqueous phases were separated. The extraction with water was repeated again. The resulting polymer solution contained less than 10 ppm of hexaethyl guanidium chloride. The ODCB and veratrole were distilled out to obtain a concentrated polymer solution having 30 weight percent polyetherimide based on the weight of the solvents. The concentrated polymer solution was pelletized by using devolatilization extrusion. The resultant polymer pellets had less than 100 ppm residual veratrole and less than 30 ppm ODCB. The polymer pellets showed acceptable properties when molded into final parts.

Example 9

Provides a Pilot Scale Method for Purifying a Polyetherimide

The polyetherimide used in this example had a weight average molecular weight of 51,000 grams per mole. The polyetherimide was prepared in a similar manner as described in Example 1. The resultant 30 weight percent solution of polyetherimide in ODCB weighed about 54.4 Kg. The solution was diluted to a 10 weight percent solution of polyetherimide by adding 45.4 Kg ODCB and 64.5 Kg veratrole. The diluted solution was cooled to 90° C. and filtered through a 10 micron rated Nomex Bag filter. The filtrate contained less than 2 ppm residual sodium chloride. The filtrate was mixed with water (60 L) at 90° C. to extract the residual hexaethyl guanidium chloride. After mixing for about 3 minutes the mixture was allowed to settle for about 60 minutes. The resultant organic and aqueous phases were separated. The extraction with water was repeated once more. The resulting polymer solution contained less than 10 ppm of hexaethyl guanidium chloride. The ODCB and veratrole were distilled out to obtain a concentrated polymer solution having 30 weight percent polyetherimide based on the weight of the solvents. The concentrated polymer solution was pelletized by using devolatilization extrusion. The resultant polymer pellets had less than 100 ppm residual veratrole and less than 30 ppm ODCB. The polymer pellets showed acceptable properties when molded into final parts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of purifying a polymer, said method comprising:
    (a) providing a first mixture comprising at least one solvent and at least one polyethersulfone, wherein the at least one solvent comprises a halogenated aromatic solvent;
    (b) diluting said first mixture with veratrole to produce a second mixture in which the polyethersulfone is substantially dissolved as indicated by a single organic phase at a temperature in a range from about 25° C. to about 100° C., and then;
    (c) performing at least one step selected from:
        (i) contacting the second mixture with an aqueous wash solution, and
        (ii) filtering said second mixture.

2. The method according to claim 1, wherein said polyethersulfone has a glass transition temperature in a range from about 230° C. to about 280° C.

3. The method according to claim 2, wherein said polyethersulfone has a glass transition temperature in a range from about 250° C. to about 270° C.

4. The method according to claim 1, wherein the polyethersulfone comprises structural units having Formula (II):

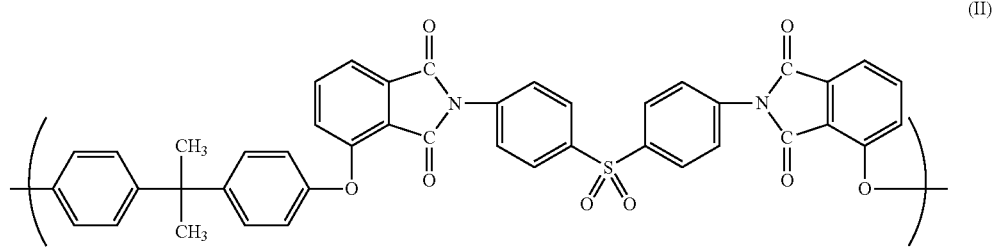

5. The method according to claim 1, wherein said at least one solvent comprises orthodichlorobenzene.

6. The method according to claim 1, wherein said at least one solvent consists essentially of orthodichlorobenzene.

7. The method according to claim 1, wherein said diluting is carried out at a temperature in a range from about 80° C. to about 250° C.

8. The method according to claim 1, wherein diluting is carried out at a temperature in a range from about 80° C. to about 180° C.

9. The method according to claim 1, wherein said aqueous wash solution comprises an acid.

10. The method according to claim 9, wherein said acid is an inorganic acid.

11. The method according to claim 1, wherein said first mixture comprises at least 20 percent by weight polymeric material based on a total weight of polyethersulfone and solvent.

12. The method according to claim 1, wherein said second mixture comprises from about 5 weight percent to about 15 weight percent of polyethersulfone based on a total weight of polymeric material, solvent, and veratrole.

13. A method of purifying a polyethersulfone, said method comprising:
(a) providing a first mixture comprising at least one solvent and at least one polyethersulfone, wherein the at least one solvent comprises a halogenated aromatic solvent;
(b) diluting said first mixture with veratrole to produce a second mixture in which the polyethersulfone is substantially dissolved at a temperature less than 100° C.;
(c) performing at least one step selected from:
(i) contacting the second mixture with an aqueous wash solution, and
(ii) filtering said second mixture.

14. A method of preparing a polymer, said method comprising:
(a) polymerizing at least two reactants to provide a first mixture comprising at least one solvent and at least one polyethersulfone, wherein the at least one solvent comprises a halogenated aromatic solvent;
(b) diluting said first mixture with veratrole to produce a second mixture in which the polyethersulfone is substantially dissolved at a temperature less than 100° C.;
(c) performing at least one step selected from:
(i) contacting the second mixture with an aqueous wash solution, and
(ii) filtering said second mixture.

* * * * *